April 25, 1961     K. J. KNUDSEN     2,981,109
TEMPERATURE-RESPONSIVE TRANSDUCER
Filed Oct. 27, 1958
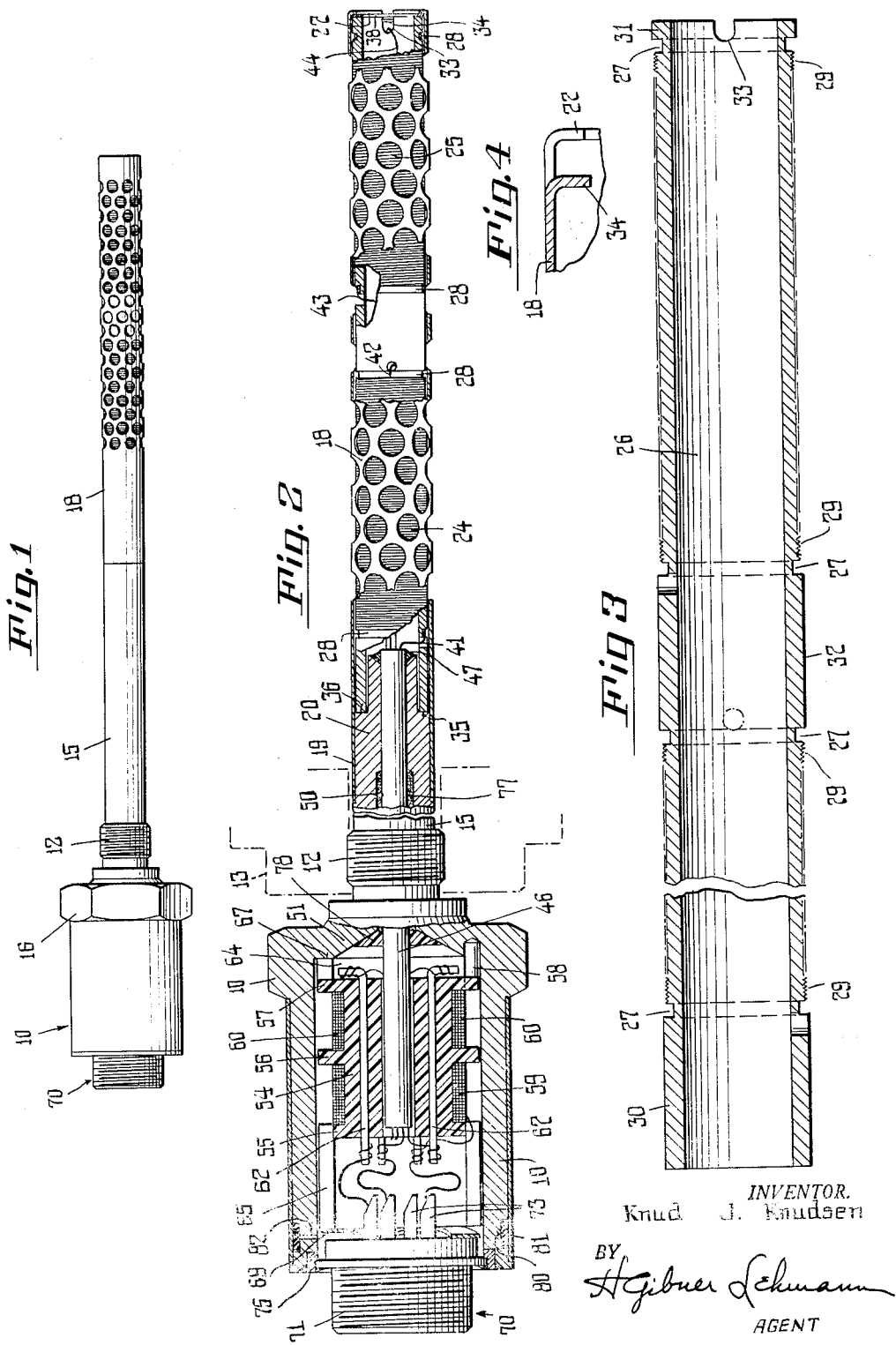
INVENTOR.
Knud J. Knudsen
BY H. Gibner Lehmann
AGENT United States Patent Office 2,981,109
Patented Apr. 25, 1961

2,981,109

TEMPERATURE-RESPONSIVE TRANSDUCER

Knud J. Knudsen, Middlebury, Conn., assignor to Lewis Engineering Company, Naugatuck, Conn., a corporation of Connecticut Filed Oct. 27, 1958, Ser. No. 769,739

13 Claims. (Cl. 73—362)

This invention relates to transducers of the type intended to be responsive to temperature changes, and more particularly to rapid-response transducers adapted for immersion in a liquid or fluid, to function under severe physical conditions.

In the past various types of temperature-responsive transducers have been proposed and used to measure the temperature changes of a surrounding medium. Usually these transducers constituted a sensing element which was encased in or supported by a tubular rod, the latter being so mounted that it and the element supported thereby changed temperature as the temperature of the surrounding medium varied.

One type of sensing element was in the form of a thermocouple junction, and another type consisted of a resistance wire or coil having the property of changing its resistance as the temperature increased or decreased. In the case of the thermocouple, a potential or E.M.F. was generated, and the value of this E.M.F. varied as the temperature of the junction changed.

In each of the above instances lead wires were brought from the sensing element through the interior of the supporting tube, to suitable electric equipment whereby the changes of E.M.F. or resistance were translated into temperature readings.

Where physical conditions associated with the heated or cooled medium surrounding the sensing element were not severe as regards vibration, forces of acceleration and the like there was no particular problem in constructing the transducers to withstand the conditions of use and to provide a reliable performance. However, with the advent of high speed travel, and of objects which are propelled through space at great velocities, together with intensified accelerating forces, the usual type of transducer has proved to be wholly unsatisfactory not only insofar as its speed of response was concerned but also with regard to its ability to withstand the greater physical forces, vibrations, accelerations and the like.

An object of the present invention is to provide a novel and improved temperature-responsive transducer which is of especially rugged construction and is adapted particularly to withstand strong and intense, vibratory forces.

A further object of the invention is to provide an improved temperature-responsive transducer as above characterized, which will also withstand high values of acceleration or deceleration.

An additional object of the invention is to provide an improved transducer device as above set forth, which may be readily utilized in connection with closed vessels having very high internal pressures, without permitting any appreciable leakage of the fluid or liquid medium contained in such vessels.

Still another object of the invention is to provide a novel transducer structure having the above characteristics and which will withstand intensified or extremely severe forces and adverse conditions of use for a predetermined minimum short interval, during which reliable temperature indications and responses will be provided.

A feature of the invention resides in the provision of a novel transducer structure which fulfills all of the above requirements and which is at the same time of relatively simple construction, involving a small number of simple components which may be readily assembled into an operable entity by existing processes and equipment.

Other features and advantages will hereinafter appear.

In the drawings accompanying this specification, similar characters of reference are used to indicate corresponding components throughout the several views, in which:

Figure 1 is a side elevational view of a transducer structure as provided by the invention.

Fig. 2 is a fragmentary axial sectional view of the transducer structure, shown on an enlarged scale.

Fig. 3 is an axial sectional view of a tubular support member for the sensing elements of the transducer.

Fig. 4 is an enlarged fragmentary sectional view of the tip portion of the transducer structure, illustrating a keying means for preventing turning of the sensing elements.

Referring to Figs. 1 and 2, the transducer structure of the invention is shown as constituted of a head or fitting 10 of tubular and preferably cylindrical configuration, said fitting being provided with means in the form of external screw threads 12 by which it may be rigidly secured to a supporting structure 13. The structure 13, for example, may be a pressurized chamber containing a liquid or fluid medium, as for example helium at very low temperatures and very high pressures.

The external threads 12 may be formed on a long and slender, tubular body or shank 15 constituted as an integral part of the fitting 10 and adapted to project into the chamber 13 so as to be immersed in the medium contained therein. The head or fitting 10 may have a flatted or hexagonal portion 16 arranged to accommodate a suitable wrench or the like, by which the fitting may be screwed to or unscrewed from the chamber 13. Preferably the fitting 10 with its tubular body 15 is constituted of a tough, corrosion-resistant metal such as stainless steel or the like, as will be readily understood. The purpose of the tubular body or shank 15 is to support sensing elements within the chamber 13 in intimate contact with the fluid or liquid medium contained therein, and also to provide a protective channel or passage for lead wires which are connected with the sensing elements and which must be brought to the exterior of the chamber in order that the temperature response of the sensing elements may be properly utilized.

In accordance with the present invention there is provided, in conjunction with the head or fitting 10 and the shank 15 thereof, a novel organization or combination including temperature-responsive sensing means or elements together with lead wires leading therefrom to the interior of the fitting 10, and further including within the fitting certain circuit components all especially adapted to withstand severe physical conditions associated with the environment of the pressurized chamber 13 and the fluid or liquid medium contained therein. Such severe physical conditions may involve appreciable vibratory forces, as well as appreciable accelerations and decelerations, together with high unit pressures within the chamber. Under such extreme adverse physical conditions the transducer structure of the invention stands up and performs in a reliable manner, and meets rigid requirements of use. Such requirements may involve a certain minimum amount of leakage of the fluid or liquid from the chamber 13, where pressures of thousands of pounds per square inch are encountered, and may involve vibratory forces of from 45 cycles per second to thousands of cycles per second, in conjunction with accelerations on the order of several dozen G. Under the worst of such conditions it is required that the transducer function for a certain minimum number of minutes, to provide reliable temperature responses.

In meeting the above severe conditions of use together with an extremely rapid response characteristic whereby rapid chanegs in temperature of the medium in the chamber 13 will be followed by a rapid response of the sensing elements the invention provides a novel sensing means and supporting structure therefor, which are mounted on the free end or extremity of the tubular body or shank 15. As shown in Fig. 2, the sensing element supporting structure comprises a relatively thin, perforated metal tube 18 which at one end 19 thereof closely telescopically fits over the free end 20 of the tubular body or shank 15. For this purpose the said end 20 of the body is preferably formed with a slightly reduced diameter, the reduction being commensurate with the thickness of wall of the supporting tube 18 whereby the adjoining surfaces of the supporting tube 18 and body 15 may be flush, as indicated. The supporting tube 18 is also preferably of a tough, corrosion-resistant metal such as stainless steel, and the attached end 19 thereof may be securely affixed to the reduced end 20 of the body 15, as by a plurality of spot welds.

At its other end the tube 15 is provided with a stop, in the form of an inturned annular shoulder 22 as shown in Figs. 2 and 4.

Within the supporting tube 18 the sensing means or elements are mounted, in a manner to provide a desirable damping action so as to reduce the effect of vibratory forces. In the illustrated embodiment of the invention, two sensing elements are shown, in the form of wire coils 24 and 25, said coils being wound on a tubular coil form or support 26, Figs. 2 and 3. The tubular coil support 26 is formed of an electrically insulating material having appreciable strength, as for example a suitable aluminum oxide composition.

As seen in Fig. 3, the tubular coil support 26 may be provided with a plurality of annular grooves 27 adapted to carry metal connector bands 28, preferably made from platinum by which connections may be established between the ends of the sensing coils 24, 25 and lead wires shortly to be described. The sensing coils 24 and 25 comprise a number of turns of fine wire, said wire being also preferably of platinum or equivalent metal and being wound in continuous spiral grooves 29 formed in the tubular coil support 26, as by the provision of external V-threads on the exterior of the coil support.

The coil support 26 has smooth end portions 30 and 31 and an intermediate smooth portion 32 all of slightly larger diameter than the remainder of the coil support as measured with the coils 24 and 25 in place thereon. Thus, the smooth portions 30, 31 and 32 are carrier portions which will space the wire coils 24 and 25 inward from the inner walls of the perforated tube 18, to prevent a short circuit from occurring between adjoining or other turns of the coils.

In accordance with the present invention the tubular coil support 26 and especially the smooth bearing portions 30, 31 and 32 thereof which are of larger diameter, are purposely arranged to fit loosely within the supporting tube 18 so that the sensing elements comprising the coils 24, 25 and the tubular coil support 26 may have limited radial movement with respect to the supporting tube. I have found that by such construction an advantageous damping action is had, which is effective in combating the effects of strong vibrations at various frequencies, to which the transducer structure may be subjected.

Also, in accordance with the invention, the tubular coil support 26 is prevented from having any turning movement, and this is accomplished by the provision of a notch 33 provided in one end of the coil support, accommodating an inturned lug 34 (see Fig. 4) provided in the end portion of the supporting tube 18. The tubular coil support 26 is further mounted directly on the extremity of the tubular body 15, as shown in Fig. 2, and for this purpose the said extremity is further reduced in diameter so as to be loosely received in the end portion 30 of the coil support 26. By such organization a further support is provided for the coil form 26 while at the same time the sensing elements are not prevented from having the aforementioned limited radial movement. However, the coil support 26 is at all times resiliently held against longitudinal or axial movement, and in accomplishing this a square shoulder 35 is provided on the tubular body 15 at the junction of the two different diameters thereof, said shoulder being arranged to abut the adjoining end or edge 36 of the coil support 26. At the other end of the coil support a resilient bowed ring or washer 38 is provided, disposed between the end of the coil support and the inturned flange 22 of the supporting tube 18. The resilient ring 38 thus maintains the edge 36 of the coil support 26 continually in engagement with the abutting shoulder 35 of the tubular body 15, and acts as a control over radial as well as axial movement of the sensing elements. However, the action of the ring 38 is not such as to rigidly mount the sensing elements in the tube 18 but instead the said elements are quite freely movable radially within the tube, for restricted distances. I have found that by such organization the damping action is such as to reduce the likelihood of failure of this portion of the transducer structure when the transducer is subjected to high accelerating and vibratory forces at natural frequencies.

The lead wires from the coils 25 and 24 are indicated at 41, 42, 43 and 44, and such lead wires are brought along the interior of the tubular coil support 26, to extend through the tubular body 15. The lead wires are sealed in the tubular body 15 with a seal which is sufficiently strong to withstand pressures of thousands of pounds per square inch, inasmuch as the interior of the tubular coil support 26 is open to the medium in which the transducer is immersed. It will be understood that under conditions of extreme vibration and acceleration such lead wires are apt to break and fail, as well as the seal effected between the wires and the body 15.

An effective sealing and protective structure is provided, in conjunction with the lead wires 41—44. The said sealing and protective structure includes a tube or jacket 46 formed of suitable composition such as stainless steel, having channel means through which the lead wires extend, said jacket being welded at 47 to the tip of the tubular body 15. The jacket 46 surrounding the lead wires 41—44 provides an effective seal therewith, and the weld 47 effectively seals the jacket 46 to the tubular body 15.

At its rightmost end the stainless steel jacket 46 is shown as closely fitting within the bore 15. This close fit extends for a limited distance, however, as the tubular body 15 has an enlarged bore 50 by which the body is appreciably spaced from the jacket 46 for the major portion of the length of the latter. Such enlarged bore 50 extends through the end wall 51 of the head or fitting portion 10 of the transducer structure, as clearly seen in Fig. 2. The jacket 46 extends an appreciable distance into the fitting 10, and is surrounded by a coil support or bobbin 54 having three shoulders 55, 56 and 57 spaced apart to provide annular reduced-diameter areas in which resistance coils 59 and 60 are disposed, for connection with the sensing coils 24 and 25 located at the tip of the transducer. Such connections are established, of course, with the lead wires passing out of the jacket 46 within the head or fitting 10. In effecting the various connections, the coil form or bobbin 54 may be provided with a plurality of relatively thick connection bars 62, extending parallel to the axis of the bobbin.

The coil form or bobbin 54 has a short, axially extending and axially slitted end flange 64 and a much longer, axially extending and axially slitted end flange 65, both being of cylindrical configuration and having diameters by which they loosely fit within the head 10. The coil form or bobbin 54 is prevented from turning by being keyed to the head 10, and for this purpose a pin 58 is secured in the end wall 51 of the head, said pin being accommodated in a suitable notch provided in the shoulder 57 of the bobbin. The end flange 64 is arranged to abut a shoulder surface 67 on the end wall 51 of the fitting 10, and the end flange 65 is engaged by a resilient bowed washer or ring 69 which also engages a connector fitting 70 of the hermetically sealed type, having external threads 71 to accommodate a cooperable female clamping ring. The fitting 70 has conducting prongs 73 as shown, by which connections are established to the resistance coils 59, 60 and to the lead wires for the sensing elements 24, 25 as shown.

The connector fitting 70 is secured to the end of the head 10 of the transducer by the use of a brass ring 75, and the engaging parts are preferably soft soldered to each other to provide a tight, hermetic seal.

In accordance with the invention, the bobbin 54 is smaller in diameter than the bore of the head or fitting 10 whereby a clearance exists therebetween to enable limited radial movement which is restricted by the ring 69, similar to the arrangement of the sensing elements 24, 25. Also, the jacket 46 has a smaller diameter than the bore of the bobbin 54 to provide clearance between these components. All of the existing space within the tubular body 15 which is not occupied by the jacket 46 is packed with a granular material 77 such as magnesium oxide powder. Such powder is preferably tightly packed around the said jacket in the interior of the body 15, providing thereby a desirable supporting and cushioning medium for the same. The granular material 77 is held in place by a sealing plug 78, which is provided at the end wall 51 of the fitting 10. The sealing plug 78 may be advantageously constituted of epoxy resin. By this organization there is further reduced the likelihood of failure of such components as the jacket and contained lead wires during severe conditions of vibration and acceleration. The sealing plug 78 also rigidly supports the jacket 46 in the tubular fitting 10, providing a vibration resistant anchorage adjacent the left end of the jacket as viewed in Fig. 2. The cushioning granules 77 further constitute an effective damping means tending to minimize the amplitude of vibration of the body 15 and accordingly the likelihood of failure thereof. Accordingly, a greater reliability of the transducer structure is had in consequence.

The invention further provides a novel pressure relief device on the head or fitting 10, to take care of slight leakage of fluid (gas) which might seep past the seal effected by the jacket 46. Referring to Figs. 1 and 2 the head 10 is provided with a shallow, relatively wide annular groove 80, in which there is disposed an elastic band 81 constituted, for example, of silicone rubber or other equivalent substance. Further, a vent hole 82 is provided between the bottom of the groove 80 and the interior of the head 10, whereby gases or fluids under pressure in the interior of the head may escape. Such vent is normally covered by the flexible band 81, and the said band consequently provides a one-way valve action in that it tends to prevent ingress of fluid from the exterior of the head 10 to the interior thereof, while permitting egress of fluid from the interior of the head.

It will now be understood from the foregoing that I have provided a novel transducer structure which is especially adapted to withstand extremely powerful vibratory and accelerative forces, and to further withstand high fluid pressures when used in conjunction with a pressurized chamber or the like. The transducer structure employs novel damping and cushioning means, and means sealing the lead wires coming from the sensing elements, as well as providing a sturdy, failure-resistant support in conjunction with a rapid response characteristic. Relatively few components are involved, and the structures and assembly operations may be fabricated and carried out mainly by existing equipment and processes.

Variations and modifications may be made within the scope of the claims, and portions of the improvements may be used without others.

I claim:

1. A rapid-response, low-temperature, vibration-and-acceleration-resistant rigid temperature-responsive type transducer comprising a fitting having means for rigidly securing it to a supporting structure; a long and slender, relatively thin, metallic tubular body carried by said fitting, said body having a thin-walled end part of relatively small mass the side walls of which have a multiplicity of perforations; and a sensing element disposed within and carried by said end part of the body, said sensing element comprising a relatively thick walled tubular support of appreciable mass and a wire coil wound tightly in a helix about said tubular support and carried thereby, said support having carrier portions of thicker wall section projecting radially beyond the said coil for engagement with the inside of the said perforated end part to space the coil from the inner surfaces of said part, said tubular coil support being loosely carried by and closely fitting in the said end part of the body and having relatively large areas of contact therewith whereby the support and body part may have relative lateral movement and different amplitudes and rates of vibration, said support constituting a damping means for said body and body part to reduce the amplitude of vibration thereof when the transducer fitting is subjected to vibratory forces.

2. A rapid-response, low-temperature, vibration-and-acceleration-resistant rigid temperature-responsive type transducer comprising a fitting having means for rigidly securing it to a supporting structure; a long and slender, relatively thin, metallic tubular body carried by said fitting, said body having a thin-walled end part of relatively small mass the side walls of which have a multiplicity of perforations; a sensing element disposed within and carried by said end part of the body, said sensing element comprising a relatively thick walled tubular support of appreciable mass and a wire coil wound tightly in a helix about said tubular support and carried thereby, said support having carrier portions of thicker wall section projecting radially beyond the said coil for engagement with the inside of the said perforated end part to space the coil from the inner surfaces of said part, said tubular coil support being loosely carried by and closely fitting in the said end part of the body and having limited axial movement in said body and relatively large areas of contact therewith whereby the support and body part may have relative lateral movement and different amplitudes and rates of vibration, said support constituting a damping means for said body and body part to reduce the amplitude of vibration thereof when the transducer fitting is subjected to vibratory forces; and means in said body, engaging the body and the said tubular support, yieldably holding the latter against unrestricted axial movement.

3. A rapid-response, low-temperature, vibration-and-acceleration-resistant rigid temperature-responsive type transducer comprising a fitting having means for rigidly securing it to a supporting structure; a long and slender, relatively thin, metallic tubular body carried by said fitting, said body having a thin-walled end part of relatively small mass the side walls of which have a multiplicity of perforations; a sensing element disposed within and carried by said end part of the body, said sensing element comprising a relatively thick walled tubular support of appreciable mass and a wire coil wound tightly in a helix about said tubular support and carried thereby, said support having carrier portions of thicker wall section projecting radially beyond the said coil for engagement with the inside of the said perforated end part to space the coil from the inner surfaces of said part, said tubular coil support being loosely carried by and closely fitting in the said end part of the body and having limited axial movement in said body and relatively large areas of contact therewith whereby the support and body part may have relative lateral movement and different amplitudes and rates of vibration, said support constituting a damping means for said body and body part to reduce the amplitude of vibration thereof when the transducer fitting is subjected to vibratory forces; and means in said body, engaging the body and the said tubular support, yieldably holding the latter against unrestricted axial movement, said means comprising a bowed ring engaging one end of the tubular support and said body having an inturned flange engaged by the said bowed ring.

4. A rapid-response, low-temperature, vibration-and-acceleration-resistant rigid temperature-responsive type transducer comprising a fitting having means for rigidly securing it to a supporting structure; a long and slender, relatively thin, metallic tubular body carried by said fitting, said body having a thin-walled end part of relatively small mass the side walls of which have a multiplicity of perforations; a pair of sensing elements disposed within and carried by said end part of the body, said sensing elements comprising a relatively thick walled tubular support of appreciable mass and a pair of wire coils wound tightly in a helix about said tubular support and carried thereby, said support having carrier portions of thicker wall section projecting radially beyond the said coils for engagement with the inside of the said perforated end part to space the coils from the inner surfaces of said part, there being three carrier portions disposed respectively at the ends and at a central portion of the support, said tubular coil support being loosely carried by and closely fitting in the said end part of the body and having relatively large areas of contact therewith whereby the support and body part may have relative lateral movement and different amplitudes and rates of vibration, said support constituting a damping means for said body and body part to reduce the amplitude of vibration thereof when the transducer fitting is subjected to vibratory forces.

5. A rapid-response, low-temperature, vibration-and-acceleration-resistant rigid temperature-responsive type transducer comprising a fitting having means for rigidly securing it to a supporting structure; a long and slender, relatively thin, metallic tubular body carried by said fitting, said body having a thin-walled end part of relatively small mass the side walls of which have a multiplicity of perforations; and a sensing element disposed within and carried by said end part of the body, said sensing element comprising a relatively thick walled tubular support of appreciable mass and a wire coil wound tightly in a helix about said tubular support and carried thereby, said support having carrier portions of thicker wall section projecting radially beyond the said coil for engagement with the inside of the said perforated end part to space the coil from the inner surfaces of said part, said tubular coil support being loosely carried by and closely fitting in the said end part of the body and having relatively large areas of contact therewith whereby the support and body part may have relative lateral movement and different amplitudes and rates of vibration, said support constituting a damping means for said body and body part to reduce the amplitude of vibration thereof when the transducer fitting is subjected to vibratory forces, said body being constituted of two separate tubular members telescoped with each other, one member having the said multiplicity of perforations and the other member having one end portion loosely fitting within one end of said tubular support.

6. A rapid-response, low-temperature, vibration-and-acceleration-resistant rigid temperature-responsive type transducer comprising a fitting having means for rigidly securing it to a supporting structure; a long and slender, relatively thin, metallic tubular body carried by said fitting, said body having a thin-walled end part of relatively small mass the side walls of which have a multiplicity of perforations; a sensing element disposed within and carried by said end part of the body, said sensing element comprising a relatively thick walled tubular support of appreciable mass and a wire coil wound tightly in a helix about said tubular support and carried thereby, said support having carrier portions of thicker wall section projecting radially beyond the said coil for engagement with the inside of the said perforated end part to space the coil from the inner surfaces of said part, said tubular coil support being loosely carried by and closely fitting in the said end part of the body and having relatively large areas of contact therewith whereby the support and body part may have relative lateral movement and different amplitudes and rates of vibration, said support constituting a damping means for said body and body part to reduce the amplitude of vibration thereof when the transducer fitting is subjected to vibratory forces, said body being constituted of two separate tubular members telescoped with each other, one member having the said multiplicity of perforations and the other member having one end portion loosely fitting within one end of said tubular support, said tubular support having limited end play in said body; and biasing means engaged with said body and tubular support, to yieldably hold the latter against unrestricted end-wise movement.

7. A housing support for a rapid-response, low-temperature, vibration-and-acceleration-resistant, rigid, temperature-responsive type transducer comprising a hollow tubular fitting having means for rigidly securing it to a supporting structure which is subject to vibration and great acceleration; a long and slender, tubular body rigidly carried by and extending an appreciable distance from said fitting, said body having an end part remote from the fitting, arranged to carry an electrical sensing element; a lead wire for connection to said sensing element, passing through said tubular body; a jacket enclosing said wire, extending within, and spaced from the inside of, the body; means positioning said jacket within the body; and a damping packing of granular material within the said tubular body, enclosing and holding the said jacket spaced from the body and cushioning the latter, said packing tending to dampen vibration of the body, said jacket and tubular body having relatively short portions closely telescopically fitting each other, and said jacket being fused to the body at points adjoining the said close-fitting portions.

8. A rapid-response, low-temperature, vibration-and-acceleration-resistant rigid temperature-responsive type transducer comprising a fitting having means for rigidly securing it to a supporting structure; a long and slender, relatively thin, metallic tubular body carried by said fitting, said body having a thin-walled end part of relatively small mass the side walls of which have a multiplicity of perforations; and a sensing element disposed within and carried by said end part of the body, said sensing element comprising a relatively thick walled tubular support of appreciable mass and a wire coil wound tightly in a helix about said tubular support and carried thereby, said support having carrier portions of thicker wall section projecting radially beyond the said coil for engagement with the inside of the said perforated end part to space the coil from the inner surfaces of said part, said tubular coil support being loosely carried by and closely fitting in the said end part of the body and having relatively large areas of contact therewith whereby the support and body part may have relative lateral movement and different amplitudes and rates of vibration, said support constituting a damping means for said body and body part to reduce the amplitude of vibration thereof when the transducer fitting is subjected to vibratory forces, said tubular support and tubular body having keying means to prevent turning of the support in the body.

9. A rapid-response, low-temperature, vibration-and-acceleration-resistant rigid temperature-responsive type transducer comprising a fitting having means for rigidly securing it to a supporting structure; a long and slender, relatively thin, metallic tubular body carried by said fitting, said body having a thin-walled end part of relatively small mass the side walls of which have a multiplicity of perforations; and a sensing element disposed within and carried by said end part of the body, said sensing element comprising a relatively thick walled tubular support of appreciable mass and a wire coil wound tightly in a helix about said tubular support and carried thereby, said support having carrier portions of thicker wall section projecting radially beyond the said coil for engagement with the inside of the said perforated end part to space the coil from the inner surfaces of said part, said tubular coil support being loosely carried by and closely fitting in the said end part of the body and having relatively large areas of contact therewith whereby the support and body part may have relative lateral movement and different amplitudes and rates of vibration, said support constituting a damping means for said body and body part to reduce the amplitude of vibration thereof when the transducer fitting is subjected to vibratory forces, said tubular support and tubular body having keying means to prevent turning of the support in the body, the said keying means comprising a finger turned in from the body, said tubular support having a notch receiving the said finger.

10. A housing support for a rapid-response, pressure-resistant temperature-responsive type transducer comprising a closed hollow tubular fitting having means for rigidly securing it to a pressurized chamber; a tubular body rigidly carried by said fitting and arranged to extend into the said chamber, said body being arranged to carry an electrical sensing element; a lead wire for connection to said sensing element, passing through said tubular body and into the fitting; means sealing said lead wire to the body, providing a gas-tight seal subject to small leakage; and a pressure relief means on said fitting, providing for the escape of leakage gas from the interior of the fitting.

11. A housing support for a rapid-response, pressure-resistant temperature-responsive type transducer comprising a closed hollow tubular fitting having means for rigidly securing it to a pressurized chamber; a tubular body rigidly carried by said fitting and arranged to extend into the said chamber, said body being arranged to carry an electrical sensing element; a lead wire for connection to said sensing element, passing through said tubular body and into the fitting; means sealing said lead wire to the body providing a gas-tight seal subject to small leakage; and a pressure relief means on said fitting, providing for the escape of leakage gas from the interior of the fitting, said pressure relief means comprising an opening in a wall of the tubular fitting and a resilient member covering said opening, said member being yieldably held against the opening.

12. A housing support for a rapid-response, pressure-resistant temperature-responsive type transducer comprising a closed hollow tubular fitting having means for rigidly securing it to a pressurized chamber; a tubular body rigidly carried by said fitting and arranged to extend into the said chamber, said body being arranged to carry an electrical sensing element; a lead wire for connection to said sensing element, passing through said tubular body and into the fitting; means sealing said lead wire to the body providing a gas-tight seal subject to small leakage; and a pressure relief means on said fitting, providing for the escape of leakage gas from the interior of the fitting, said pressure relief means comprising an opening in a wall of the tubular fitting and a resilient member covering said opening, said member being yieldably held against the opening, said tubular fitting having an annular groove in which the opening is disposed and said resilient member comprising an elastic band located in the said groove.

13. A housing support for a rapid-response, low-temperature, vibration-and-acceleration-resistant, rigid, temperature-responsive type transducer comprising a hollow tubular fitting having means for rigidly securing it to a supporting structure which is subject to vibration and great acceleration; a long and slender, tubular body rigidly carried by and extending an appreciable distance from said fitting, said body having an end part remote from the fitting, arranged to carry an electrical sensing element; a lead wire for connection to said sensing element, passing through said tubular body; a jacket enclosing said wire, extending within, and spaced from the inside of, the body; means positioning said jacket within the body; and a damping packing of granular material within the said tubular body, enclosing and holding the said jacket spaced from the body and cushioning the latter, said packing tending to dampen vibration of the body; and means rigidly supporting said jacket in the said hollow tubular fitting and sealing the granular material in said tubular body, said means comprising a sealing annulus of resinous composition, encircling the jacket and engaging the walls of an opening in the fitting, through which the jacket extends.

References Cited in the file of this patent

UNITED STATES PATENTS

| | | |
|---|---|---|
| 1,726,068 | Hoeschen | Aug. 27, 1929 |
| 2,016,660 | Weeks | Oct. 8, 1935 |
| 2,750,483 | Voorman | June 12, 1956 |
| 2,780,703 | MacIntyre | Feb. 5, 1957 |
| 2,800,018 | Phillips et al. | July 23, 1957 |